(12) United States Patent
Khibit et al.

(10) Patent No.: US 11,473,473 B2
(45) Date of Patent: Oct. 18, 2022

(54) DEVICE TO CONVEY A CHEMICAL REACTANT INTO THE EXHAUST GAS STREAM OF A COMBUSTION ENGINE

(71) Applicant: HJS Emission Technology GmbH & Co. KG, Menden (DE)

(72) Inventors: Aomar Khibit, Dortmund (DE); Thomas Kästner, Dortmund (DE); Klaus Schrewe, Rüthen (DE)

(73) Assignee: HJS EMISSION TECHNOLOGY GMBH & CO. KG, Menden (DE)

( * ) Notice: Subject to any disclaimer, the term of this patent is extended or adjusted under 35 U.S.C. 154(b) by 0 days.

(21) Appl. No.: 17/420,512

(22) PCT Filed: Jan. 14, 2020

(86) PCT No.: PCT/EP2020/050786
§ 371 (c)(1),
(2) Date: Jul. 2, 2021

(87) PCT Pub. No.: WO2020/148268
PCT Pub. Date: Jul. 23, 2020

(65) Prior Publication Data
US 2022/0090530 A1     Mar. 24, 2022

(30) Foreign Application Priority Data
Jan. 17, 2019    (DE) ..................... 20 2019 100 256.5

(51) Int. Cl.
*F01N 3/28*     (2006.01)
*F01N 3/035*     (2006.01)
*F01N 3/20*     (2006.01)

(52) U.S. Cl.
CPC ........... *F01N 3/2892* (2013.01); *F01N 3/035* (2013.01); *F01N 3/2066* (2013.01);
(Continued)

(58) Field of Classification Search
CPC ...... F01N 3/035; F01N 3/2066; F01N 3/2892; F01N 2240/06; F01N 2240/20;
(Continued)

(56) References Cited

U.S. PATENT DOCUMENTS

| | | |
|---|---|---|
| 4,485,621 A | 12/1984 | Wong et al. |
| 8,904,764 B2 | 12/2014 | Baier et al. |

(Continued)

FOREIGN PATENT DOCUMENTS

| | | |
|---|---|---|
| CN | 206016920 U | 3/2017 |
| CN | 107060961 A | 8/2017 |

(Continued)

OTHER PUBLICATIONS

International Search Report dated Jul. 23, 2020 in parent International application PCT/EP2020/050786.
(Continued)

*Primary Examiner* — Audrey B. Walter
(74) *Attorney, Agent, or Firm* — Polson Intellectual Property Law, PC; Margaret Polson; Christopher Sylvain

(57) ABSTRACT

A device for supplying a chemical reactant into the exhaust system of an internal combustion engine, comprising: a mixer housing; a metering pipe passing through the mixer housing, towards which the exhaust flow flowing into the mixer housing flows in a transverse direction, and having a first end and a second end; a metering unit arranged at the first end of the metering pipe and connected to a reactant supply for discharging reactant into the metering pipe; and means for generating a swirl flow of the exhaust flow within the metering pipe. The metering pipe has at least one inflow opening extending over a casing surface segment of no less than 45° in the circumferential direction and extending over at least one section of the length of the metering pipe, said inflow opening having a shovel-like hood arranged on the metering pipe and directing the exhaust flow eccentrically into the inflow opening.

20 Claims, 8 Drawing Sheets

Figure 1:
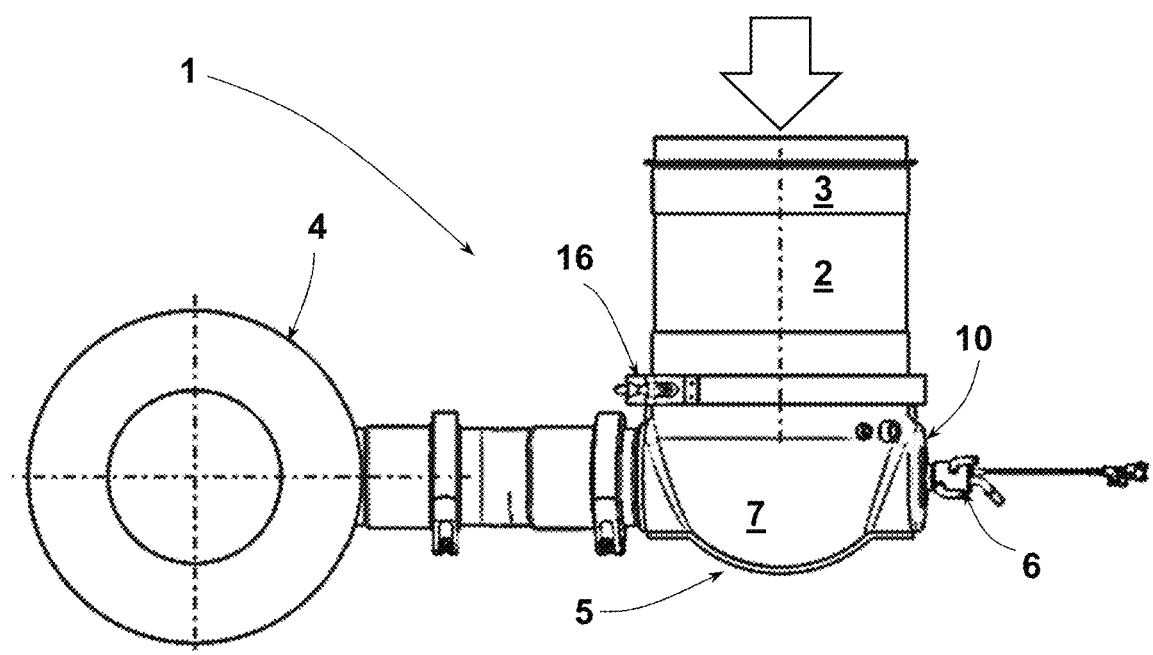

(52) U.S. Cl.
CPC ...... *F01N 2240/06* (2013.01); *F01N 2240/20* (2013.01); *F01N 2250/02* (2013.01); *F01N 2470/18* (2013.01); *F01N 2570/14* (2013.01); *F01N 2610/02* (2013.01); *F01N 2610/1453* (2013.01)

(58) Field of Classification Search
CPC ............ F01N 2250/02; F01N 2470/18; F01N 2570/14; F01N 2610/02; F01N 2610/1453
See application file for complete search history.

(56) References Cited

U.S. PATENT DOCUMENTS

| | | | |
|---|---|---|---|
| 9,115,622 B2 | 8/2015 | Baier et al. | |
| 2015/0020484 A1* | 1/2015 | Kimura | B01F 25/3131 55/459.1 |
| 2016/0305296 A1* | 10/2016 | Tobe | B01F 25/10 |
| 2020/0347767 A1* | 11/2020 | El-Gammal | B01F 25/103 |

FOREIGN PATENT DOCUMENTS

| | | |
|---|---|---|
| EP | 2607641 A1 | 6/2013 |
| EP | 3093463 A1 | 11/2016 |
| WO | 2011163395 A1 | 12/2011 |
| WO | 2015018971 A1 | 2/2015 |
| WO | 2016142292 A1 | 9/2016 |
| WO | 2016207484 A1 | 12/2016 |

OTHER PUBLICATIONS

International Preliminary Report on Patentability, Chapter II, dated Nov. 19, 2020 in parent International application PCT/EP2020/050786.

* cited by examiner

DEVICE TO CONVEY A CHEMICAL REACTANT INTO THE EXHAUST GAS STREAM OF A COMBUSTION ENGINE

BACKGROUND

The present disclosure relates to a device to convey a chemical reactant into the exhaust stream of a combustion engine, comprising
- a mixer housing having an inlet opening through which the exhaust flow enters the mixer housing,
- a metering pipe passing through the mixer housing, towards which the exhaust flow flowing into the mixer housing flows in a transverse direction, and having a first end and a second end,
- a metering unit which is arranged at the first end of the metering pipe and can be connected to a reactant supply for dispensing reactant into the metering pipe, and
- means for generating a swirl flow of the exhaust flow.

Furthermore, an exhaust gas purification system is described for reducing the NOx content of the exhaust gas of an internal combustion engine using such a device.

Modern internal combustion engines, for example if they are diesel engines which are mainly used as dynamically loaded diesel engines, are equipped with an exhaust gas purification system to meet emission requirements. These requirements relate, among other things, to a limit on NOx emissions. In such exhaust gas purification systems, NOx emissions are in many cases brought about by a selective catalytic reaction of the nitrogen oxides (NOx-) contained in the exhaust gas. So-called SCR catalysts (SCR: selective catalytic reduction) are used for this purpose. A reducing agent is required as the reaction medium for the desired catalytic reduction of nitrogen oxides to take place at such an SCR catalyst. Ammonia is typically used for this purpose, which is introduced into the SCR catalyst in the form of liquid urea upstream of the catalyst. A specific temperature is required to release the reducing agent (ammonia) contained in the precursor. Therefore, it is necessary that the exhaust gas temperature is sufficiently high for effective denitrification of the exhaust gases. The reactions to release the reducing agent from the precursor do not occur spontaneously, especially if the exhaust gas temperatures are not sufficiently high, but require a certain amount of time. For this reason, a certain flow path is required between the metering unit with which the precursor is fed and the SCR catalyst. Once the reducing agent (ammonia) is released, the desired catalytic reaction to reduce or eliminate the nitrogen oxides carried in the exhaust gas takes place at the SCR catalyst. It is not desirable if precursor which has not yet been converted flows against the SCR catalyst, since the liquid droplets would then be deposited on the upstream surface of the SCR catalyst. In addition, when flowing into the SCR catalyst, the best possible uniform distribution of the reducing agent released in the exhaust gas flow and also a uniform velocity distribution over its cross-sectional area is desired. Precipitation of liquid precursor in the exhaust gas tract should also be avoided as far as possible.

In order to meet these requirements for the supply of a reducing agent metered as a liquid precursor, WO 2015/018971 A1 as well as WO 2016/207484 A1 propose to arrange a metering pipe inside a mixer housing, at one end of which a metering unit for injecting the precursor is arranged. The metering pipe is designed as a hole or screen plate and has a conical shape, with its cross-sectional area decreasing in the direction away from the metering unit. The metering pipe is hit by a flow at right angles to its longitudinal extension. The end section of the metering pipe engages in a jacket tube opposite the metering unit, leaving an annular gap. In the device according to this prior art, a swirl flow is generated on the outer side of the metering pipe. This flow is accelerated within the annular gap between the metering pipe and the jacket tube, which gap serves as a nozzle. Due to the speed difference between the external swirl flow and the exhaust gas flow inside the metering pipe, the precursor injected into the metering pipe in the form of liquid droplets is intermixed with the exhaust gas flow. A baffle plate is arranged on the outlet side of the metering pipe, through which the exhaust gas flow is deflected into the opposite direction. The reducing agent is sprayed onto this guide element, which is distributed in the exhaust gas flow deflected by the element. The reducing agent is released over a short distance, such that this previously known device can also be used with limited available installation space. Due to the multiple deflection of the exhaust gas flow in respectively opposite flow directions, a respective exhaust gas back pressure must be accepted.

WO 2011/163395 A describes another metering and mixing arrangement for use in an exhaust gas aftertreatment system. In this prior art, the metering pipe is also configured as a perforated plate tube, but has a cylindrical shape. The metering pipe is arranged transversely with respect to the exhaust gas flow to be cleaned, located in a housing. Upstream of the incoming exhaust gas in the direction of flow, there is a guide element in the housing which is adapted to guide the incoming exhaust gas past the metering pipe in order to generate a swirl flow on the outside of the metering pipe.

As with the prior art previously appreciated, this prior art also follows the concept of generating a swirl flow outside a metering pipe configured in the manner of a perforated plate, which flow continues into the pipe interior as a result of the openings arranged in the manner of a grid. The disadvantage of such a design of such an exhaust gas purification system is that the reducing agent supplied in liquid form can be deposited in an uncontrolled manner in the perforations of the metering pipe on the respective flow shadow side, such that it cannot be guaranteed that the reducing agent quantity currently required for sufficient denitrification is actually supplied to the downstream SCR catalytic converter. NOx slip can therefore not be ruled out.

A mix box for an exhaust system of an internal combustion engine for mixing additives into an exhaust gas flow is known from WO 2016/142292 A1 In this device, too, there is a transverse flow against the metering pipe, namely through an inlet tube arranged parallel to the metering pipe, which is designed as a strainer tube in its section parallel to the outlet tube, such that the exhaust gas emerges from the inlet tube in the radial direction. A flow volume is located between these two pipes. This is bounded on the edges by flow guide elements which influence the deflection of the exhaust gas flow leaving the inlet pipe in the circumferential direction or in the radial direction relative to the outlet pipe serving as the metering pipe. Thus, in this prior art as well, a swirl flow is generated outside the metering pipe and enters it through openings made in the outlet tube. In a further development, the inflow openings of the metering pipe (outlet tube) are equipped with vanes projecting from the outer shell surface. The spray cone with which the liquid reducing agent precursor is injected into the metering pipe is designed such that it impinges on the inner surface of the metering pipe in the area of the inflow opening of the metering pipe.

Even if the required flow path for releasing the reducing agent contained in a liquid precursor as a chemical reactant is possible on a shorter flow distance compared to other designs due to the effect described above, and this device can therefore also be used in confined installation space conditions, it would be desirable if the required installation space could be further reduced and if it were nevertheless possible to convert the precursor to release the reactant contained therein even at lower exhaust gas volume flows, without having to accept an unacceptable deposition of liquid precursor droplets.

SUMMARY

Proceeding from this background, the present disclosure is therefore based on further developing a device of the type mentioned at the outset in order to meet these requirements.

This is provided, according to the present disclosure, by a device of the type mentioned at the outset, in which the means for generating the swirl flow are designed to generate it within the metering pipe, and for this purpose, the metering pipe has at least one inflow opening extending over a circumferential surface segment of no less than 45° and over at least a portion of the length of the metering pipe located inside the mixer housing, with a shovel-like hood arranged on the metering pipe and directing the exhaust gas flow eccentrically into the inflow opening.

In this device for feeding a chemical reactant into the exhaust tract of an internal combustion engine, particularly for feeding ammonia to an SCR catalytic converter, wherein this chemical reactant is injected into the exhaust tract in the form of a liquid precursor divided into droplets, a swirl flow is first generated inside the metering pipe as a result of the deflection of the exhaust gas flow flowing transversely against the metering pipe via the at least one shovel-like hood into the metering pipe. This allows the formation of a particularly high-energy swirl flow by simple means and without necessarily having to accept an exhaust back pressure that is sometimes too high. A higher-energy swirl flow with a correspondingly higher flow rate favors droplet transport of liquid precursor droplets introduced into the swirl flow.

The swirl flow of the exhaust gas is generated inside the metering pipe by utilizing the lateral flow of the exhaust gas into the metering pipe. The metering pipe has at least one inflow opening through which the exhaust gas flow enters the metering pipe. This at least one inflow opening extends in the circumferential direction of the metering pipe over a shell surface segment of no less than 45°. In the longitudinal extension of the metering pipe, this at least one inflow opening extends over at least 40 to 60% of the length of the section of the metering pipe located in the mixer housing in the metering pipe flow space. The metering pipe flow space may be bounded by the mixer housing itself or by a component located inside the mixer housing. In the metering pipe flow space, incoming exhaust gas can flow around the metering pipe. Nevertheless, the desired swirl flow in the metering pipe is only provided within it by deflecting the exhaust gas flow into the metering pipe. According to one embodiment, the inflow opening extends in the direction of the longitudinal extension of the metering pipe over at least 70 to 75% of its length located inside the mixer housing. Due to the extension of the at least one inflow opening in the circumferential direction of the metering pipe outlined above, the number of possible inflow openings is limited. Moreover, the cross-sectional area of the at least one inflow opening with its shovel-like hood for receiving the waste gas flow is correspondingly large, such that for this reason alone deposits of reactants, such as liquid urea droplets as ammonia precursors, are virtually ruled out. The cross-sectional area of the at least one inflow opening is adapted to the velocity of the swirl flow to be generated and to the expected exhaust gas volume flow. Due to the design of this feed device, the cross-sectional area against which the exhaust gas flows against the metering pipe is significantly larger than the cross-sectional area of the metering pipe.

A special feature of this device is that each inflow opening is equipped with a shovel-like hood arranged thereon. Due to the shovel-like design of the hood, the inflow opening is enclosed at the sides and rear and at least largely covered in the radial direction. It is entirely possible for the mouth of the hood to project over the front inflow-side edge of the inflow opening covered by it. Such a hood serves to direct the exhaust gas flow flowing transversely towards the metering pipe into the inflow opening. For this purpose, at least one hood arranged on an inflow opening points with its mouth in the direction of the inlet opening of the exhaust gas into the mixer housing, so that the exhaust gas entering the mixer housing flows at least partially directly into the hood and thus into the inflow opening of the metering pipe. The tangential deflection of the exhaust gas flow into the metering pipe, which typically has a circular cross-sectional geometry, leads to the desired exhaust gas swirl flow on the inner wall of the metering pipe. Since the swirl flow is generated inside the metering pipe, only lower flow losses have to be accepted, in contrast to previously known designs of such equipment. If multiple inflow openings are provided and consequently also multiple hoods are arranged on the outer surface of the metering pipe, their hood mouths are oriented in the same direction viewed in the circumferential direction of the metering pipe. Since the metering pipe is located in the mixer housing, crossing it, the lateral inflow area of the exhaust gas flow is significantly larger than the cross-sectional area of the typically cylindrical metering pipe. As a result, when the exhaust gas flow enters such a hood and thus the interior of the metering pipe, it experiences significant acceleration, both in the direction of rotation of the swirl flow and in the longitudinal extension of the metering pipe. Since the metering pipe is closed on its first end by the metering unit, the swirl flow within the metering pipe propagates from this end to the second end of the metering pipe.

In this device for feeding a chemical reactant into the exhaust tract of an internal combustion engine, the slope of the swirl flow generated in the metering pipe can be adjusted via the exhaust gas back pressure. The lower the gradient at which the swirl flow moves towards the second end of the metering pipe, the longer the flow path, but without having to extend the actual length of the metering pipe for this purpose. For this reason, the overall length of conventional equipment for the preparation required to release the desired ammonia, for example, can be reduced by more than 50% if aqueous urea solution is fed in.

In a preferred embodiment, the spray angle at which the liquid reactant is injected into the metering pipe is set up in such a way that the precursor droplets only come into contact with the inner wall of the metering pipe downstream of the at least one inflow opening, at least to the extent that they have not previously been picked up by the exhaust gas swirl flow. The section of the metering pipe in the flow direction of the exhaust gas downstream of the inflow openings is the section in which the highest flow rates of the exhaust gas swirl flow are observed. In addition, the exhaust gas flowing into the device generally flows against the outside of this section of the metering pipe adjacent to the at least one inflow opening and is heated by this in a particular way. This is utilized in a special design of an operation of this feed device. In this mode of operation, contrary to the prevailing doctrine, liquid precursor is injected into the metering pipe at a volume such that it impinges on this heated inner wall section of the metering pipe. As a result, larger precursor droplets are broken up into smaller droplets by the impact and, in addition, this heated metering pipe section is used to release the reactant contained in the precursor, such as ammonia. Through this process, the required flow path for the release of the reactant and for the desired uniform distribution of the same within the exhaust gas flow can already be achieved in a shorter pipe section. The liquid precursor is preferably metered in such a way that, after a first metering cycle, the subsequent metering cycle is not started until precursor sprayed onto the inner wall of the metering pipe has evaporated. Preferably, the precursor is dispensed under pressure via the metering unit, i.e., it is injected into the interior of the metering pipe in the axial direction at a predetermined pressure, for example, a pressure between 6 and 10 bar.

In one embodiment of such a device, the at least one inflow opening is arranged off-center with respect to the longitudinal extent of the metering pipe within the metering pipe flow space, that is, offset in the direction toward the metering unit. This means that the distance of the hood of the at least one inflow opening from the wall section defining the metering pipe flow space in the direction towards the second end of the metering pipe is greater than the distance of this hood from the opposite wall. This ensures that a good proportion of the exhaust gas flows against the outside of the metering pipe section located downstream of the at least one inflow opening in the direction of flow of the exhaust gas through the metering pipe, and typically also flows around that pipe. This section of the metering pipe is directly exposed to the exhaust gas flowing through the at least one inflow opening, with the result that this section of the metering pipe is particularly well heated by the incoming exhaust gas. This section of the outer surface of the metering pipe heated by the incoming exhaust gas can be about four to six times as long as the section of the metering pipe from the hood to the opposite wall defining the metering pipe flow space. The length of the one or multiple inflow openings in the longitudinal direction of the metering pipe also influences the different spacing.

The direction of transport in the longitudinal direction of the metering pipe ensures that the injected precursor droplets are transported in the longitudinal direction of the metering pipe away from the location of injection and typically do not accumulate, for example, in the vicinity of the injection, are partially deposited and can build up there.

In one embodiment, flush openings are provided in the metering pipe in the metering pipe section adjacent to the metering unit, which openings may well be arranged at a direct radial distance from the injectors, in order to obtain an exhaust gas flow also directly in the area of the precursor droplet delivery within the metering pipe in order to avoid possible precursor droplet deposits in the area of the injector nozzle(s). This exhaust gas entering the interior of the metering pipe generates a partial exhaust gas flow directly at the injector orifice(s) and thus at the metering flange carrying the metering unit. This keeps the injector(s) free of precursor droplet deposits. The swirl flow generated within the metering pipe does not or only to a minor extent affect the centrally arranged injector(s), which is why flush openings of this type are a very simple but effective means of keeping the injectors free of precursor deposits. This is supported by turbulences which occur between the jacket flow flowing along the inner wall of the metering pipe and the partial exhaust gas flow entering through the flush openings, Such flush openings can be holes arranged in the manner of a grid, certainly in the form of a circumferential ring. The openings may have a circular or oblong cross-sectional area. The cross-sectional area of the sum of the flush openings can be used to adjust the exhaust gas back pressure and thus also the gradient of the swirl flow in the direction towards the second end of the metering pipe.

In such a device, it is expedient for a hood to have its mouth pointing toward the inlet opening of the mixer housing. Then the exhaust gas enters directly into the hood mouth and is eccentrically directed into the metering pipe. As a result of the associated reduction in cross-section, the exhaust gas flow experiences the desired acceleration. The leading edge of the inflow opening of the metering pipe in the direction of flow of the exhaust gas is typically located in the area of the central longitudinal plane of the metering pipe running transversely to the direction of flow of the exhaust gas, or is located a few angular degrees in front of this plane, According to one embodiment of such a device, this inflow opening extends over about 90°, or over a few angular degrees more than 90°, e.g. about 95 to 100°. According to one embodiment of such a device, the hood is a separately manufactured component which is placed on the outer shell surface of the metering pipe and welded to it on three sides. This simplifies the degrees of freedom in the manufacture of the hood with respect to its geometry. Welding the hood to the outer surface of the metering pipe is advantageous, since there are no elements protruding from the inner wall of the metering pipe for fastening the hood to or on the metering pipe, which could influence and thus impair the swirl flow flowing along said inner wall. In such a hood, the rear or baffle wall of the hood, which serves to direct the flow, is arranged on the rear edge of the inflow opening with respect to the direction of flow of the exhaust gas.

The shape of such a hood can be used to influence the formation of the swirl flow, According to a first example embodiment, the hood is trapezoidal in a developed view, wherein its wall opposite the inflow opening is adjusted to the contour of the inner wall of the mixer housing. The trapezoidal shape reduces the cross-sectional area enclosed by the hood in the direction of the swirl tube interior, causing the exhaust gas flow to accelerate.

In another embodiment, the at least one hood is tapered from its mouth to its rear end. This allows the hoods to be designed with a lower height, such that the inflow openings can be moved closer to the metering flange if an approximately hemispherical mixer housing is provided. As a result, the mixer housing can be designed more compactly.

Figure 17:
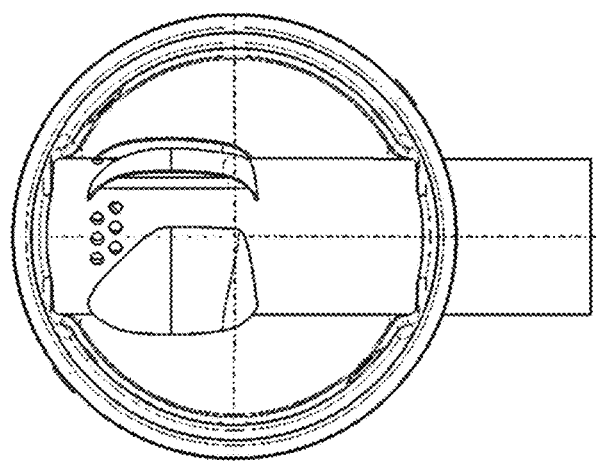

In one embodiment, the mixer housing is hemispherical in shape, which means that the mixer housing requires very little installation space. In addition, this allows the arrangement of the device in different positions in the space. Such a design is possible because the swirl flow is generated inside the metering pipe. The hemispherical inner shell surface of the mixer housing avoids fluidic dead spaces, which would increase flow resistance due to the turbulence generated therein. In addition, due to this design of the mixer housing, in which the opening of the hemispherical mixer housing is the inlet opening, the exhaust gas flow experiences a certain reduction in cross-sectional area and thus already a certain acceleration before it is directed into the at least one inflow opening of the metering pipe. The metering pipe crossing the mixer housing in its center divides the exhaust gas flow, so to speak. If the exhaust gas flow against the metering pipe, the heat carried in the exhaust gas flow is effectively transferred to the metering pipe, which in turn counteracts a precipitation of precursor droplets, also by condensation on the inner side of the metering pipe. For this reason, the deflector housing part typically present at the outlet of a first exhaust gas purification unit, for example a particulate filter, possibly with an upstream oxidation catalyst, can be used to accommodate the metering pipe therein and thus to use this housing part for a feed device according to the present disclosure. As a result, this component, which is already available in terms of its installation space, can be expediently used for liquid precursor metering, without requiring significantly more installation space.

Further acceleration of the exhaust gas flow for generating the swirl flow is achieved according to one embodiment in that the at least one inflow opening has a trapezoidal outline geometry in a developed view of the outer surface of the metering pipe, wherein the shorter side of this outline geometry with respect to the flow direction of the exhaust gas is the rear edge following the longitudinal extension of the metering pipe. In the case of at least one inflow opening, the hood associated with this inflow opening is located inside the mixer housing. Typically, particularly if the mixer housing has a hemispherical inner surface, the contour of the hood follows the inner contour of the mixer housing. A gap may be left between the hood and the inner shell surface of the mixer housing. In this gap, the incoming exhaust gas flow, insofar as it is not directed by the hood through the inflow opening into the metering pipe, is also accelerated somewhat and flows around the outside of the hood and the metering pipe. This also creates a specific swirl flow on the outside with respect to the metering pipe. This supports the all-round heating of the metering pipe, above all, in its section between the inflow openings covered by the hoods and the wall defining the metering pipe flow space in the direction of the second end of the metering pipe. In addition, this allows the design of a metering pipe with, for example, two inflow openings, which are typically arranged diametrically opposite to each other with respect to the longitudinal axis of the metering pipe. The exhaust gas flow that bypasses the metering pipe is then captured and fed to the swirl flow inside the metering pipe via the hood of this second inflow opening. Likewise, such a device may be equipped with more than two inflow openings, for example, four inflow openings. The number of inflow openings should not exceed six to eight. If the number of inflow openings is larger, the energy input for forming the exhaust swirl flow is low. An embodiment with two to four inflow openings is preferred.

According to one embodiment, the mixer housing is made of two parts. According to one embodiment, the longitudinal axis of the metering pipe is located in the area of the seam of the two mixer housing parts. This allows easy integration of the metering pipe into the mixer housing. Typically, the mixer housing is equipped with thermal insulation on the outside for heat preservation. With such a configuration of the mixer housing or the feed device, the at least one hood can be mounted outside the mixer housing on the metering pipe.

In another embodiment, the mixer housing is made in one piece, and the metering pipe is inserted therein. In such a configuration, the at least one hood is mounted on the metering pipe when the latter is already inserted into the mixer housing.

In the design of the mixer housing with an inlet opening whose cross-sectional area is significantly larger than the cross-sectional area of the metering pipe, this larger cross-sectional area can be used to connect the mixer housing directly to the outlet of an exhaust gas purification unit upstream of the mixer in the direction of flow of the exhaust gas. Such an exhaust gas purification unit may be a particulate filter or an oxidation catalyst. Against this background, it is particularly advantageous to design the mixer housing with a hemispherical geometry, since the inlet opening is then circular, which is the typical outline geometry of the housing of an exhaust gas purification unit. The diameters of the mixer housing and the exhaust gas purification unit upstream thereof are matched to each other. For this reason, conical housing parts and exhaust line sections between the units that are otherwise used can be avoided, which in turn contributes to a reduction in required installation space.

According to a preferred embodiment, the device described is part of an exhaust gas purification system with which the nitrogen oxides carried in the exhaust gas flow are reduced. An SCR catalyst is then installed downstream of the device in the direction of flow of the exhaust gas.

The device described above can be used for all internal combustion engines operating with excess air, including, for example, gas engines or hydrogen engines.

BRIEF DESCRIPTION OF THE DRAWINGS

The following description is provided using example embodiments with reference to the appended figures, wherein:

FIG. 1 shows a schematic view of an exhaust gas purification system inserted into the exhaust tract of a diesel internal combustion engine with a feed device for supplying a chemical reducing agent, FIG. 2 shows a perspective view of the feed device of FIG. 1 from a first direction, FIG. 3 shows a perspective view of the feed device of FIG. 1 from another direction provide a view into the feed device, FIG. 4 shows an exploded perspective view of the feed device of FIGS. 2 and 3, FIG. 5 shows a front view of or into the inlet opening of the feed device of the previous figures, FIG. 6 shows a sectional view taken along line A-A of FIG. 5 through the feed device, FIG. 7 shows a perspective view of a feed device corresponding to that of the preceding figures according to another example embodiment to provide a view into this feed device, FIG. 8 shows a sectional view corresponding to that of FIG. 6 through the feed device of FIG. 7, FIG. 9 shows a front view of or into the inlet opening of a feed device of the previous figures, FIG. 10 shows a perspective single view of the swirl tube of the feed device of FIG. 9, FIG. 11 shows a front view of or into the inlet opening of a feed device according to yet another example embodiment, FIG. 12 shows a sectional view through the feed device of FIG. 11 in the area of the centers of the hoods covering the inflow openings, FIG. 13 shows a longitudinal sectional view through the feed device of FIG. 11, FIG. 14 shows a perspective external view of a feed device according to yet another example embodiment, FIG. 15 shows a front view of or into the inlet opening of the feed device of the FIG. 14, FIG. 16 shows another example embodiment of a feed device in a front view of or into its inlet opening; and FIG. 17 shows another example embodiment of a feed device in a front view of or into its inlet opening.

DETAILED DESCRIPTION

Figure 2:
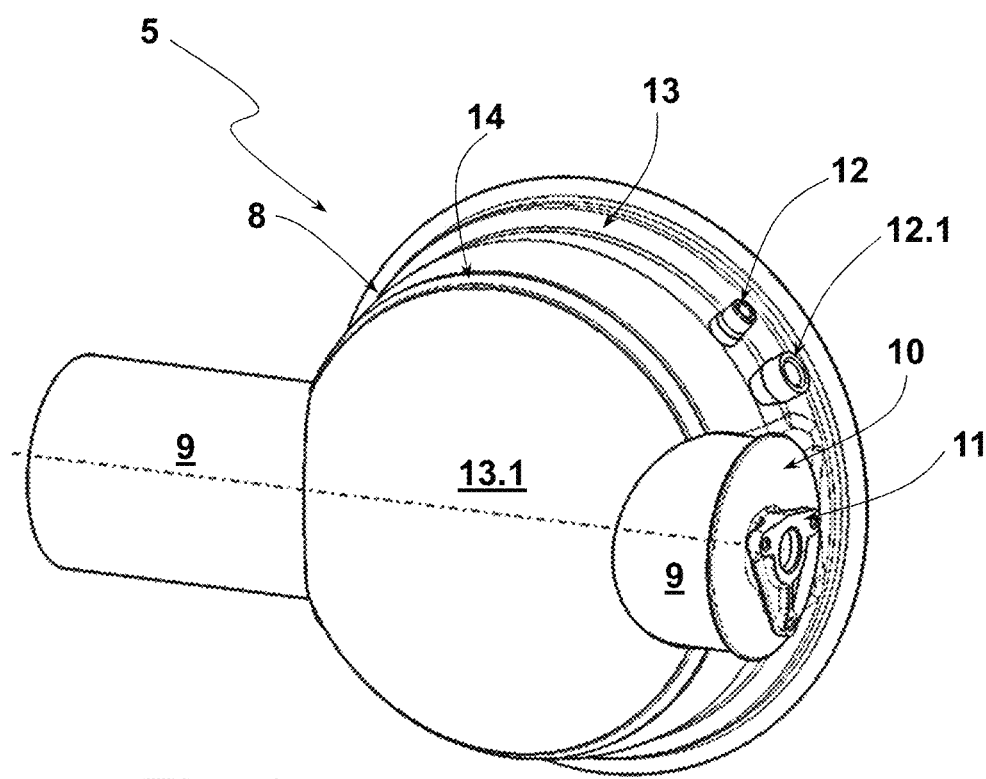

In the exhaust gas purification system 1 shown as an example in FIG. 1, the system is connected to the exhaust tract of a motor vehicle diesel engine that is not shown in more detail. In the example embodiment shown, the exhaust gas purification system 1 comprises a particulate filter 2, an oxidation catalyst 3 connected upstream of the filter in the direction of flow of the exhaust gas, and an SCR catalyst 4. A device for supplying a reducing agent, in this case an aqueous urea solution, to the exhaust tract or the exhaust gas flow flowing therethrough is connected between the particulate filter 2 and the SCR catalytic converter 4. This feed device is identified in FIG. 1 by the reference numeral 5. The feed device 5 comprises a metering unit 6, which is connected in an unspecified manner to a reducing agent supply, a compressed air supply, and to a control unit for controlling the reducing agent supply. The feed device has a spherical mixer housing 8 covered by a thermal insulation 7 (see also FIG. 2). Part of the feed device 5 is a metering pipe 9 which passes through the mixer housing 8. In the embodiment shown, the metering pipe 9 is a cylindrical tube. The first end of the metering pipe 9 is closed with a closure plate 10. The metering unit 6 is connected to the closure plate 10. For this purpose, the closure plate 10 carries a metering unit port 11. The metering pipe 9 is led out of the mixer housing 8 and its insulation 7 on the side opposite the closure plate 10 and is connected to the exhaust line section leading to the SCR catalyst 4. The exhaust gas enriched with the reducing agent injected via the metering unit 6 flows out of the second end of the metering pipe 9 and into the SCR catalytic converter 4.

The mixer housing 8 carries sockets 12, 12.1 for a temperature sensor and a pressure sensor, respectively. These sensors are designed to detect the temperature and pressure inside the mixer housing 8. The sensors are not shown in the figures. The mixer housing 8 of the illustrated embodiment has two sockets 12, 12.1 on diametrically opposite sides in each case. Depending on the requirements and the available installation space, the sensors can be arranged on one or on the other side of the mixer housing 8.

In the example embodiment shown, the mixer housing 8 is configured in two parts and has a first mixer housing part 13 and a second mixer housing part 13.1. The connecting section of the two mixer housing parts 13, 13.1 located in the dividing plane of the mixer housing 8 is identified in FIG. 2 by the reference numeral 14. The connecting section 14 is located in the plane of the longitudinal extension of the metering pipe 9.

Figure 3:
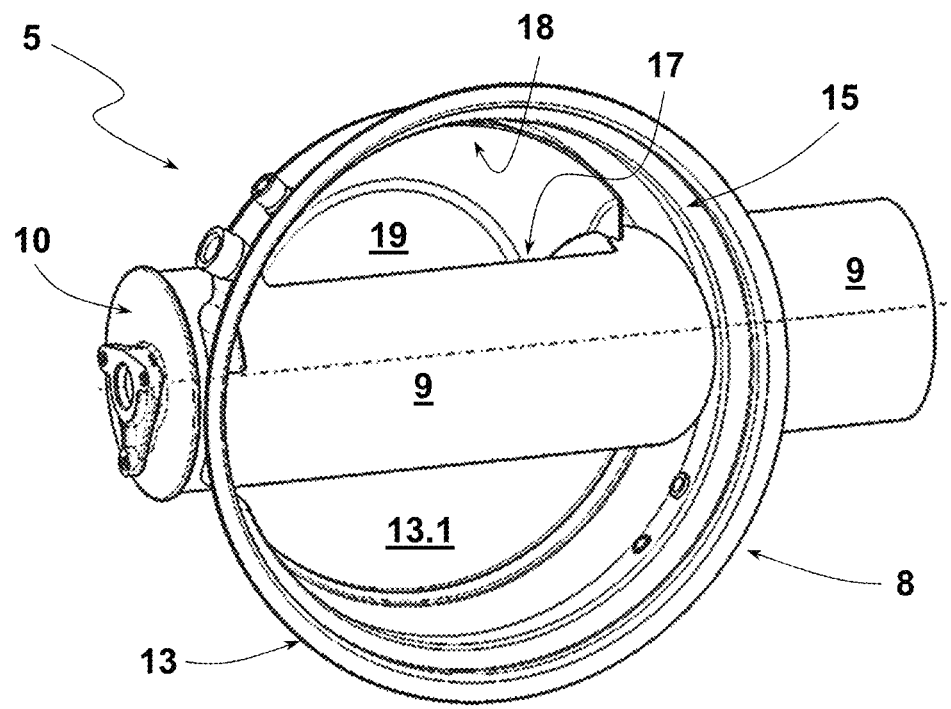
Figure 4:
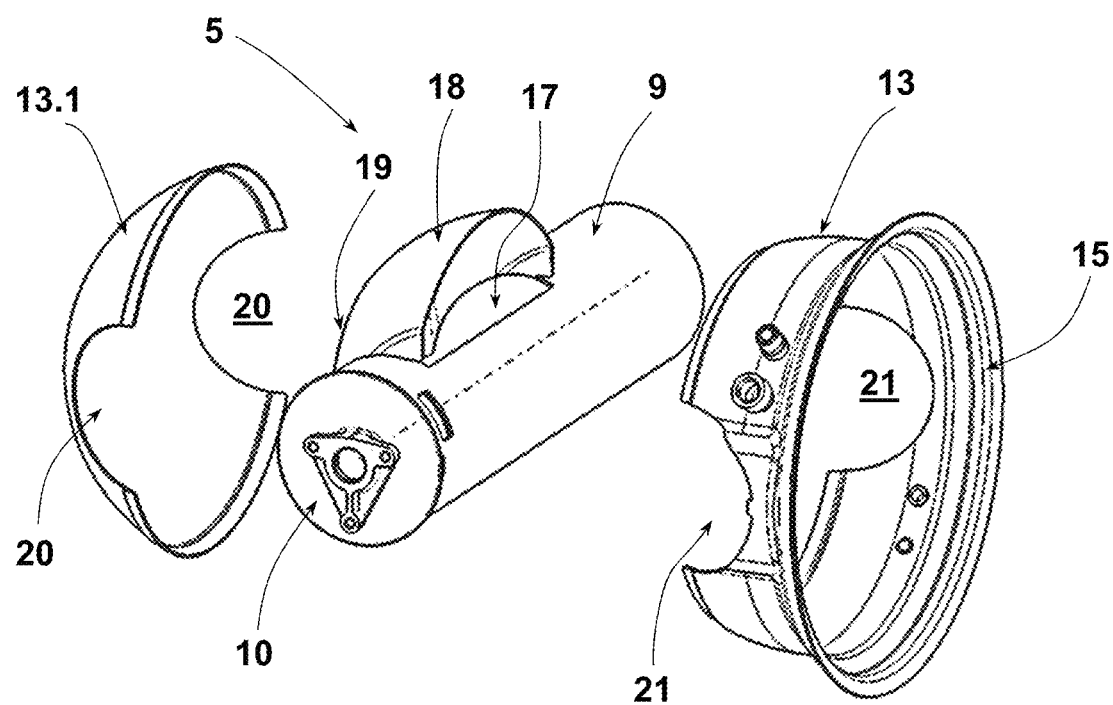

The layout and arrangement of the metering pipe 9 with its passage through the mixer housing 8 can be seen in FIG. 3. FIG. 3 allows a view of the inside of the mixer housing 8 through its inlet opening 15, through which the exhaust gas flowing out of the particulate filter 2 enters the feed device 5. The feed device 5 is connected to the housing of the particulate filter 2 by a clamp 16 (see FIG. 1). The feed device 5 is connected to the housing of the particle filter 2 without intermediate pieces. The diameter of the inlet opening 15 of the feed device 5 is adjusted to the housing diameter of the particle filter 2.

In the example embodiment shown, the metering pipe 9 has a single inflow opening 17. This is a perforation in the metering pipe 9 which extends in the longitudinal direction of the metering pipe as far as possible across the section of the metering pipe 9 with which it crosses the interior of the mixer housing 8. Viewed in the circumferential direction, this inflow opening 17 extends over approximately 95°. This inflow opening 17 is covered by a hood 18. The hood 18 is welded to the outer surface of the metering pipe 9 on three sides. The mouth of the hood 18 points in the direction of the inlet opening 15. In this way, the inflow opening 17 is enclosed on three adjacent sides by the hood 18 and welded to the shell surface of the metering pipe 9. These are the two walls of the hood 18 facing in the longitudinal direction of the metering pipe 9 and its rear wall or baffle wall 19. In the example embodiment shown, the hood 18 is initially manufactured independently of the metering pipe 9. Its wall areas adjoining the outer surface of the metering pipe 9 are welded to the metering pipe 9. The mixer housing 8 is configured in two parts with its hood 18 for simplified assembly of the metering pipe 9. Both mixer housing parts 13, 13.1 have a metering pipe receptacle 20 and 21, respectively, on diametrically opposite sides with respect to the central longitudinal axis of the mixer housing 8. The individual parts described are all stainless steel parts.

Figure 6:
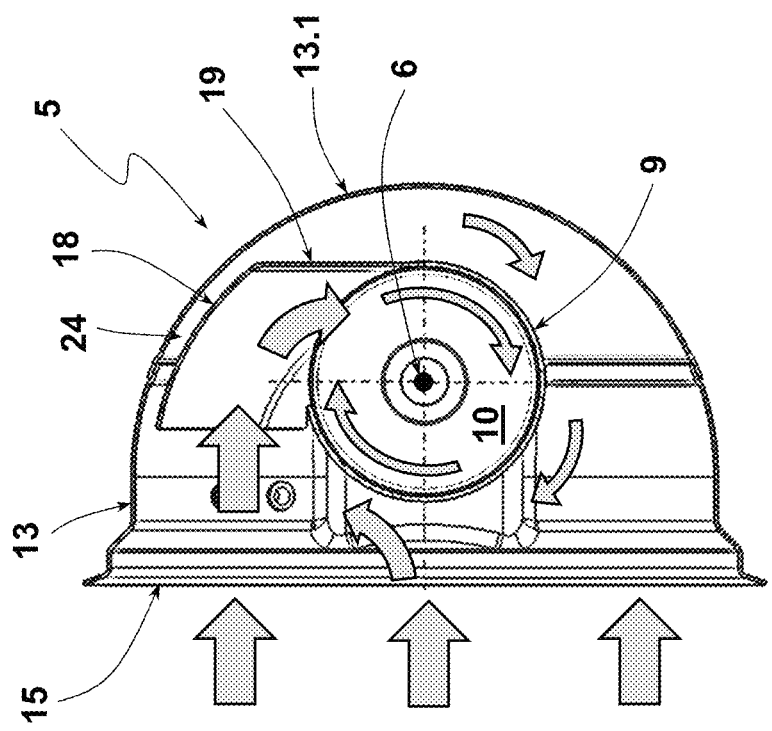
Figure 5:
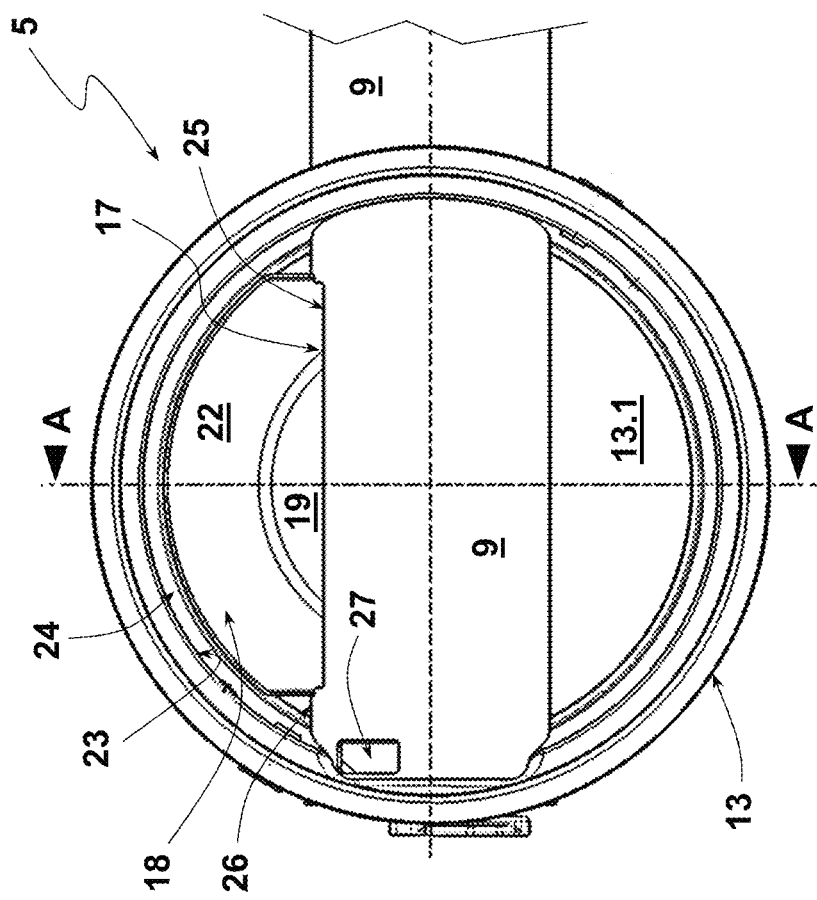

Due to the hemispherical inner contour of the mixer housing 8, the hood 18 is adjusted to this curvature in two directions, as can be seen from FIGS. 5 and 6. A gap 24 remains between the top 22 of the hood 18 and the inner wall 23 of the mixer housing 8, through which exhaust gas flowing into the mixer housing 8 through the inlet opening 15 can also flow past the outside of the hood 18.

As can be seen in FIGS. 5 and 6, the leading edge 25 of the inflow opening 17 is located in front of the hood-side apex 26, which can be seen in FIG. 5. This favors the formation of a swirl flow inside the metering pipe 9. The metering pipe 9 crosses the interior of the mixer housing 8 centrally.

The metering pipe 9 has a flush opening 27 in the immediate vicinity of the closure plate 10, which can also be called a metering flange. The flush opening 27 in this example embodiment is rectangular in shape. The flush opening 27 is used to introduce a portion of the exhaust gas flowing against the shell surface of the metering pipe 9 in order to cause it to sweep past the injector nozzle outlet(s) of the metering unit 6. This effectively prevents deposits of precursor droplets.

The sectional view in FIG. 6 shows the flow path of the exhaust gas flow leaving the particulate filter 2 and entering the mixer housing 8 of the feed device 5 through the inlet opening 15. The exhaust gas flow enters the mixer housing 8 of the feed device 5 through the circular inlet opening 15 over the entire surface of the inlet opening 15. The exhaust gas hitting the shell surface of the metering pipe 9 heats the metering pipe 9 if it is not yet at the temperature of the exhaust gas flow. The hood 18 deflects a large part of the exhaust gas flow through the inflow opening 17 into the interior of the metering pipe 9. This supply of the exhaust gas flow into the metering pipe 9 is eccentric (see FIG. 6), such that a swirl flow is generated in the metering pipe 9, as indicated by the block arrows in FIG. 6. The exhaust gas flow entering the metering pipe 9 is accelerated due to the reduction in cross-sectional area between the cross-sectional area of the inlet opening 15 and the cross-sectional area of the hood 18 directing the exhaust gas flow into the metering pipe 9 or the inflow opening 17. This is desired in order to generate a sufficiently energetic flow as a swirl flow within the metering pipe 9, by which reducing agent droplets (aqueous urea solution) injected axially from the metering unit 6 into the metering pipe 9 are entrained, and from these droplets the actual reducing agent ammonia is released. This process is favored by the sudden increase in velocity experienced by the urea solution droplets injected through the metering unit 6 when they meet the exhaust gas flow entering the metering pipe 9 at a high rate. The swirl flow continues helically from the closure plate 10 toward the other end of the metering pipe 9. The swirl flow has its greatest velocity adjacent to the inner wall of the metering pipe 9.

The exhaust gas which flows past the hood 18 through the gap 24 flows around the metering pipe 9, as shown schematically in FIG. 6. Depending on the incoming exhaust gas volume flow, this can lead to the formation of a specific swirl flow outside the metering pipe 9, but at a much lower rate than inside the metering pipe 9. The exhaust gas flowing into the lower area of the mixer housing 8 is caused not to flow around the metering pipe 9 on the underside, but is deflected in the direction of the hood due to the acceleration which this exhaust gas partial flow experiences when flowing around the hood 18.

Figure 7:
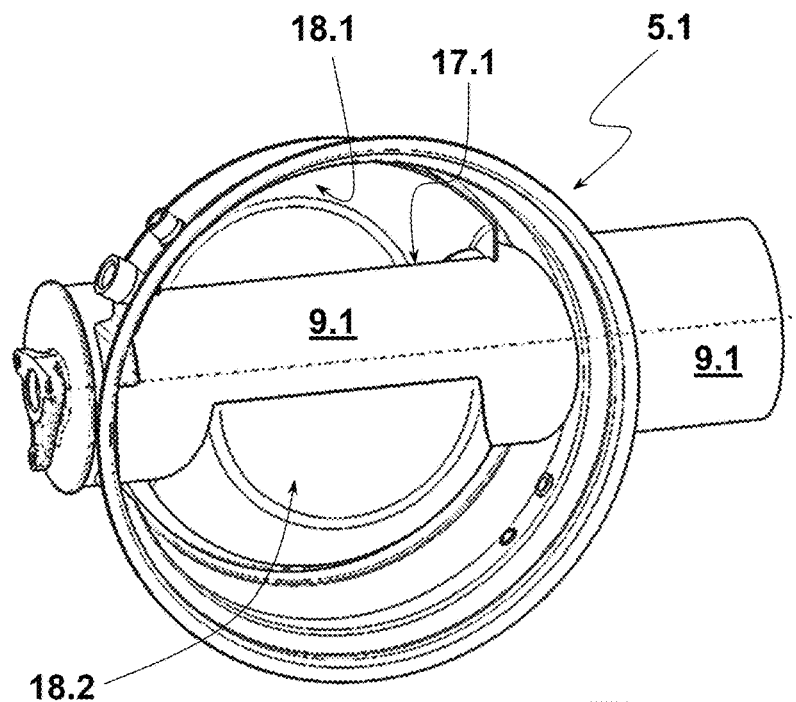
Figure 8:
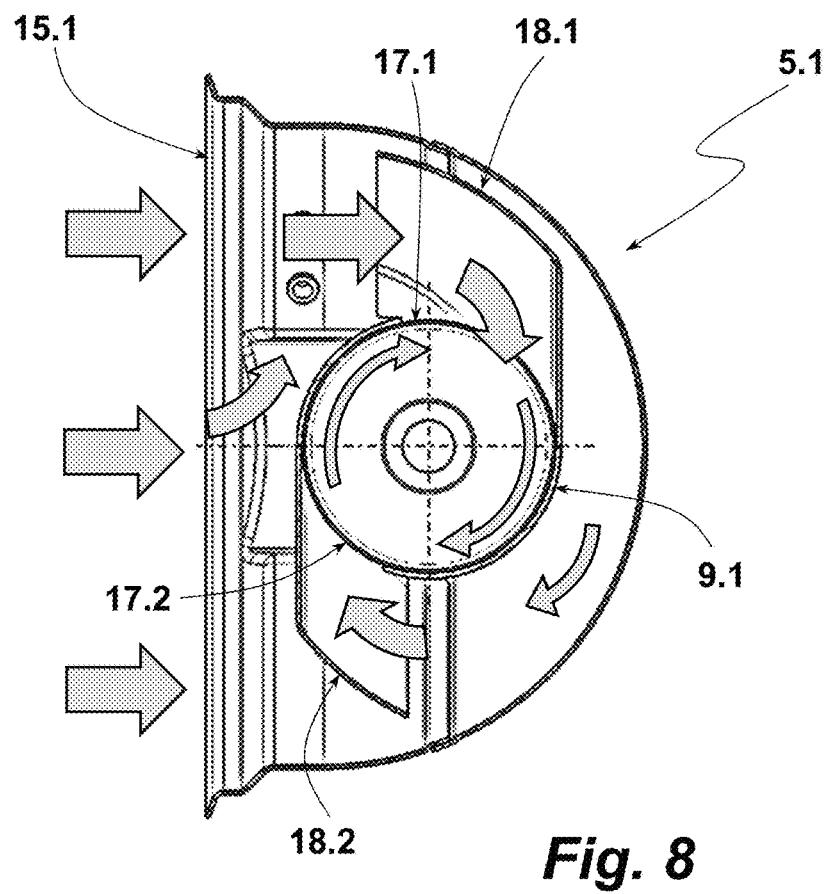

FIGS. 7 and 8 show another feed device 5.1, which is basically constructed like the feed device 5 described in the previous figures. In this respect, the above statements, unless otherwise explained below, apply likewise to the feed device 5.1. With respect to the feed device 5.1 in FIGS. 7 and 8, the same elements or components having the same reference numerals as used for the feed device 5 are identified by a suffix ".1" or an accordingly higher numeral (e.g. ".2") if the suffix ".1" has already been used in the example embodiment of FIGS. 1 to 6.

The feed device 5.1 differs from the feed device 5 only in that the latter has two diametrically opposed inflow openings 17.1, 17.2 and, accordingly, two hoods 18.1, 18.2. As can be seen from the sectional view in FIG. 8, the hoods 18.1, 18.2 are aligned with the circumferential direction of the metering pipe 9.1 with respect to their hood mouths, such that the exhaust gas partial flows deflected through them into the metering pipe enter in the direction of rotation of the swirl flow due to their eccentric entry. While the inflow opening 17.1 with its hood 18.1 is designed in the same way as the inflow opening 17 and the hood 18 of the feed device 5, the second inflow opening 17.2 of the feed device 5.1 has a smaller cross-sectional area than that of the inflow opening 17.1. In the example embodiment shown, the circumferentially extending shell surface segment over which the inflow opening 17.2 extends is shorter than that of the inflow opening 17.1. The inflow opening 17.2 is a few angular degrees less than 90°. The exhaust gas flow passing the hood 18.1 is largely captured by the hood 18.2 and also eccentrically directed into the interior of the metering pipe 9 through the inflow opening 17.2. The swirl flow that occurs inside the metering pipe 9.1 is similar in energy to that which occurs inside the metering pipe 9. Therefore, the uniform distribution values of velocity as well as the uniform distribution values of the reducing agent entrained in the flow are quasi identical to those described above with respect to the feed device 5.

In the example embodiment shown in the figures, the mixer housing 8 is hemispherical in shape. Even if such a configuration of the mixer housing is expedient and the metering pipe crosses the mixer housing centrally, such that it has the longest possible extension within the mixer housing, the metering pipe may also cross the mixer housing off-center. This is particularly possible in embodiments without sacrificing any length of the metering pipe located inside the mixer housing, if the mixer housing has a geometry that deviates from the circular base geometry, for example a square or rectangular base geometry.

Figure 9:
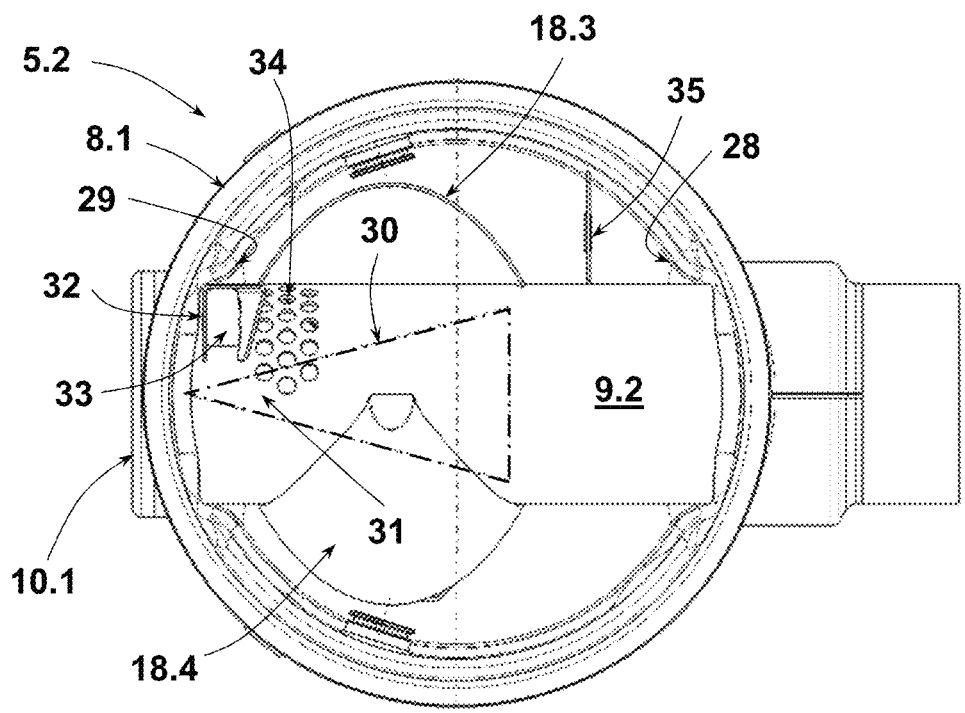

FIG. 9 shows another example embodiment of a feed device 5.2, which is basically constructed like the feed device 5.1. In the case of the feed device 5.2, in contrast to the feed device 5.1, the two inflow openings are located off-center with respect to the metering pipe 9.2 in its section located inside the mixer housing 8.1. The shovel-like hoods 18.3, 18.4 covering the inflow openings of the metering pipe 9.2 are V-shaped in a developed view and thus conical in the direction towards the end opposite their mouths. Due to the off-center arrangement of the hoods 18.3, 18.4 or the inflow openings located underneath them, the distance of the metering pipe-side termination of the hoods 18.3, 18.4 with the wall 28 defining the metering pipe flow space surrounding the metering pipe 9.2 is significantly greater in the direction toward the second end of the metering pipe 9.2 than the distance of the opposite termination of the hoods 18.3, 18.4 with the opposite wall 29. The walls 28, 29 are each wall sections, since the inner wall of the mixer housing 8.1 is formed by a continuous wall. The distance between the hoods 18.3, 18.4 and the wall 28 in the example embodiment shown is about five times the distance to the wall 29. The exhaust gas flowing in through the inlet opening directly flows against the section of the metering pipe 9.2 which follows the inflow openings in the direction of flow of the exhaust gas through the metering pipe 9.2. This exhaust gas not only flows against the metering pipe 9.2 in this section, but also flows around it. Therefore, this section of the metering pipe 9.2 is particularly well heated, with the result that liquid reactant which may have settled or is settling on the inside wall will evaporate immediately at the respective temperature of the exhaust gas.

In FIG. 9, the spray cone 30 of the metering unit 6 connected to the closure plate 10.1 is shown as a dashed dotted line. The spray cone 30 is configured at such an angle that precursor droplets injected by the metering unit 6 do not reach the inner wall of the metering pipe 9.2 until after the inflow openings, should they not already have been picked up as suspended load by the swirl flow during an operation of the feed device 5.2. In the example embodiment shown, the spray angle is about 30°. In this embodiment, the inner wall of the tube located downstream of the inlet hoods 18.3, 18.4 in the direction of flow of the exhaust gas within the metering pipe 9.2 is used such that the precursor droplets impinge thereon and are broken up into smaller droplets due to the impact energy. Small droplets evaporate more rapidly due to their relatively larger surface area. In addition, these also evaporate on the heated inner wall of this metering pipe section. This measure can optimize the release of the ammonia contained in the precursor as a reducing agent without increasing the exhaust gas back pressure, thus further reducing the flow path required to release the reducing agent and achieve the desired uniform distribution.

The feed device 5.2 also has a flush opening arrangement 31. The flush opening arrangement 31 comprises a flush opening 33 provided with a hood 32, which is located outside the hood 18.3, the mouth of which points in the direction of flow of the exhaust gas. Further flush openings 34 are located in the manner of a grid formed by circular openings in the alignment of the mouth of the hoods 18.3, 18.4. These also serve to reduce the pressure drop.

Figure 10:
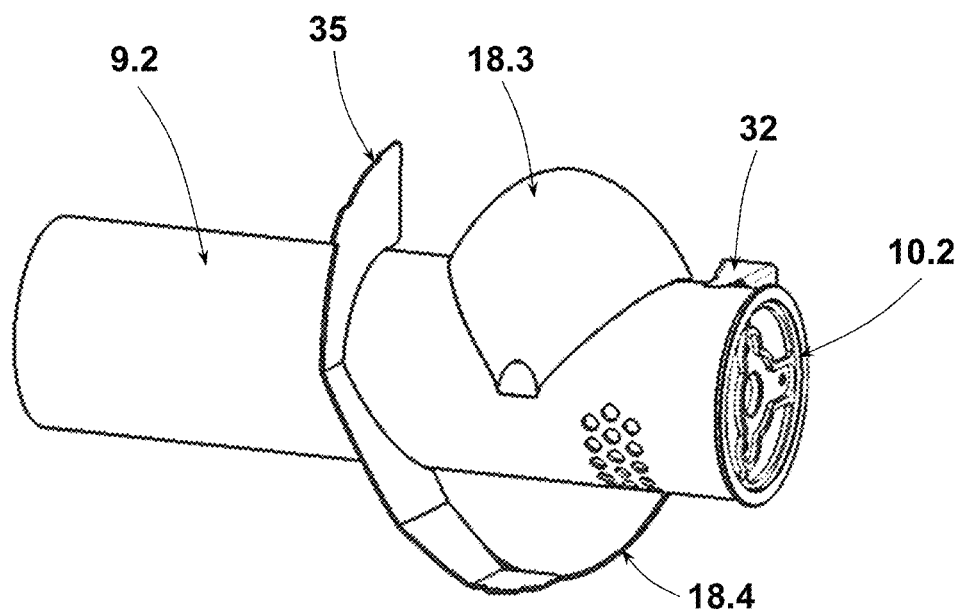

In this embodiment, a baffle plate 35 is inserted in the metering pipe flow space and extends around the rear side of the metering pipe 9.2 (see FIG. 10). The extension of the baffle plate 35 is better visible in this sole view of the metering pipe 9.2, which shows the metering pipe from the opposite viewing direction as in FIG. 9. The baffle plate 35 is used to feed exhaust gas through the metering pipe flow space to the mouth of the hood 18.4. Due to this measure, in the example embodiment shown, about 60% of the incoming exhaust gas flows through the hood 18.3 and the inflow opening associated with it into the interior of the metering pipe 9.2, while only 40% of the exhaust gas is directed into the interior of the metering pipe 9.2 through the inflow opening associated with the hood 18.4.

Figure 11:
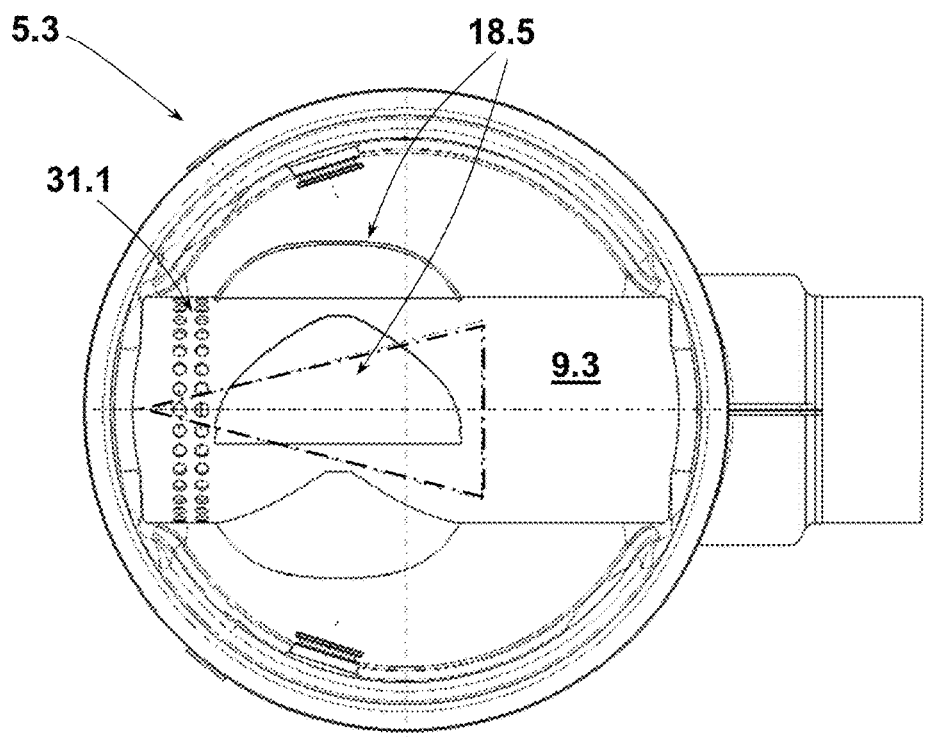

FIG. 11 shows another embodiment of a feed unit 5.3. This one has four hoods 18.5 and respective inflow openings arranged below them, which have an angular spacing of 90° from one another (see the sectional view of FIG. 12). In this embodiment, the closure plate carrying the metering unit is inserted into the metering pipe 9.3, as can be seen in the longitudinal sectional view of FIG. 13. The closure plate is identified therein by the reference numeral 10.2. Such an arrangement of the closure plate 10.2, namely its integration into the first end of the metering pipe, may also be provided in other embodiments. This embodiment is not bound to the other features of the feed device 5.3.

A flush opening arrangement 31.1 is ring-shaped in design in the direction of the closure plate 10.2 adjacent to the arrangement of the hoods 18.5, in the example embodiment shown by means of two annular rows of holes (see FIG. 11). These serve to flush the inside of the closure plate 10.2 or the injectors of the metering unit not shown in this figure that project through it, and likewise to reduce the pressure loss. Elongated hole-like openings may also be provided instead of the cross-sectional geometry of the flush openings of this flush opening arrangement 31.1.

Figure 12:
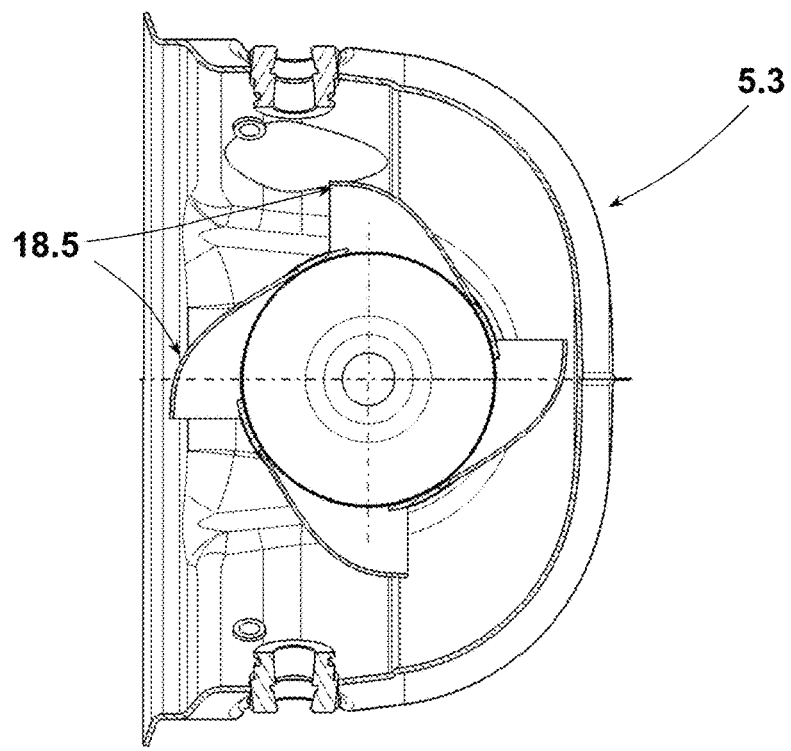
Figure 13:
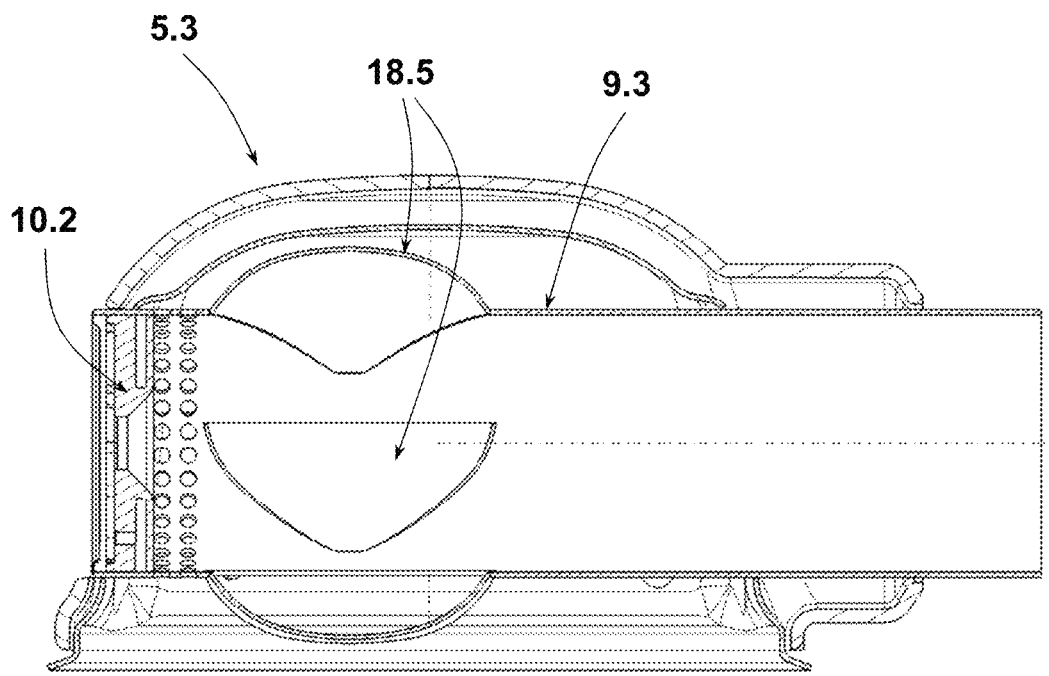

As is visible in FIG. 12, the hoods 18.5 of the feed device 5.3 and the inflow openings below them are arranged in such a way that the mouth of the upper hood 18.5 shown in FIG. 12 points against the inflow direction of the exhaust gas. Instead of such an orientation of the hoods 18.5, they can also have an orientation which is rotated counterclockwise or clockwise by 45° with respect to the orientation at the feed device 5.3.

Figure 14:
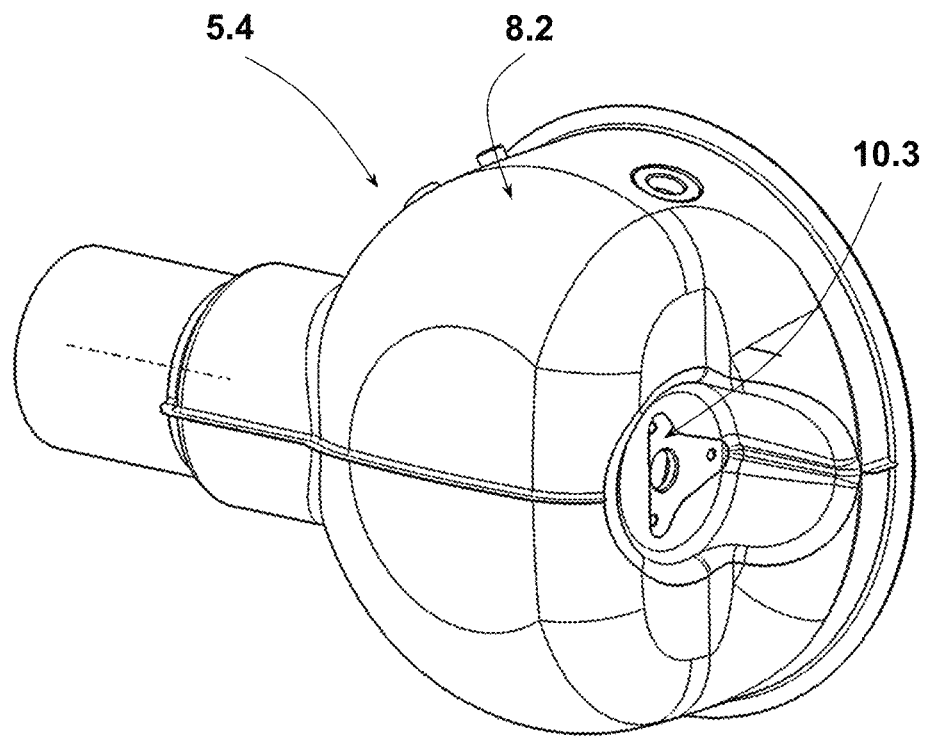
Figure 15:
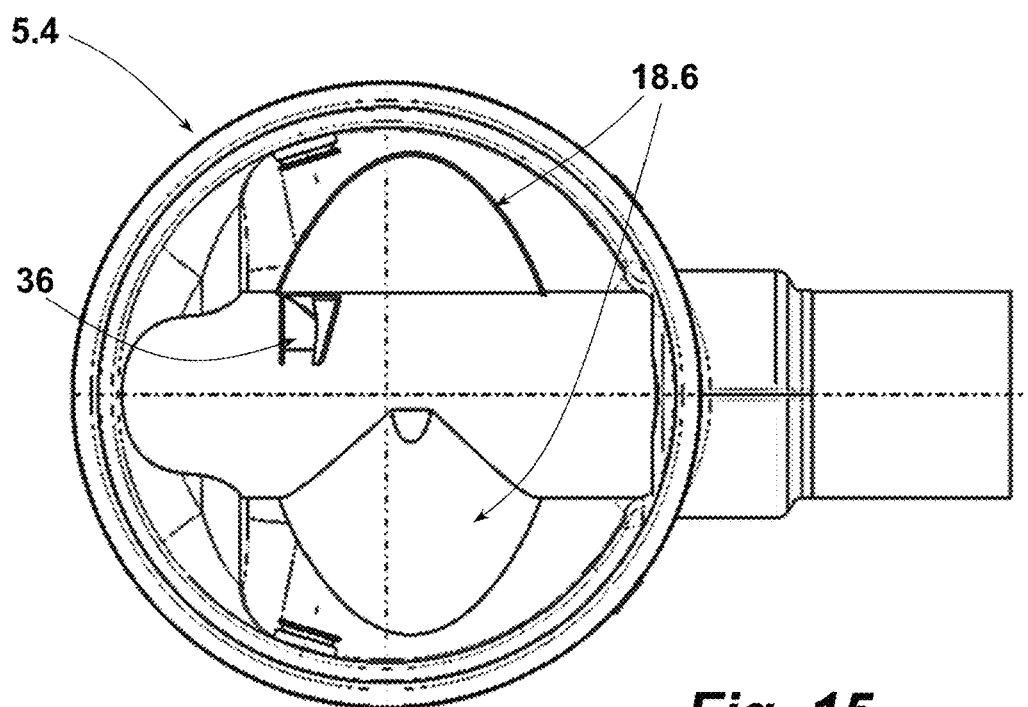

Another example embodiment of a feed device 5.4 is shown in FIG. 14. This example embodiment corresponds to that of FIGS. 9 and 11, but with the difference that the mixer housing 8.2 has an embossment on the side comprising the closure plate 10.3. This serves the purpose of integrating the injector(s) of the metering unit into the installation space of the mixer housing 8.2. The hoods 18.6 of the feed device 5.4 are conical in shape, as can be seen particularly well from the illustration in FIG. 15, wherein the left edge of the hoods 18.6, which can be seen in FIG. 15, is virtually in alignment with the inside of the closure plate 10.3. In addition, the feed device 5.4 has a flush opening 36 to allow an additional exhaust gas flow to sweep past the injector(s) of the metering unit.

Figure 16:
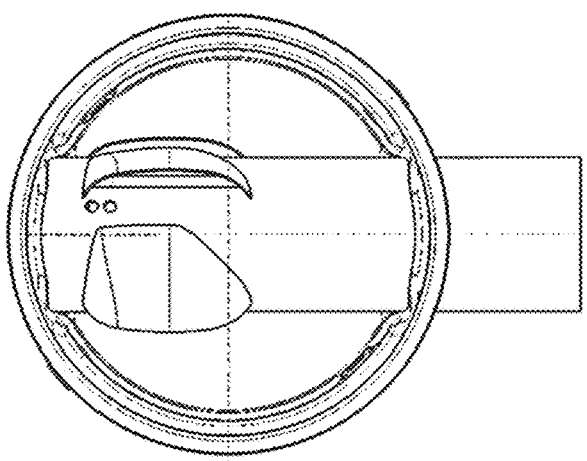

The feed devices of the above-described example embodiments each have a symmetrical configuration with respect to their extension in the longitudinal direction of the respective metering pipe. FIGS. 16 and 17 show different hood designs in this respect. The hood design in the feed device shown in FIG. 16 is adapted to direct the incoming exhaust gas toward the inside of the closure plate. In the design of the hoods shown in FIG. 17, incoming exhaust gas is deflected away from the inside of the closure plate.

In an embodiment not shown in the figures, the two hood types of FIGS. 16 and 17 are combined. In this embodiment, these are arranged alternately in the circumferential direction. These embodiments make it clear that the swirl characteristics can be influenced by simple changes in the geometry of the hoods.

The foregoing examples of the design of the hoods can be used independently of the specific example embodiments shown in FIGS. 16 and 17 for all other example embodiments, particularly the foregoing example embodiments.

The invention has been described with reference to example embodiments. Without departing from the scope of the claims, a person skilled in the art will see other embodiments, modifications and options of implementing the invention, which do not need to be further explained or shown in detail herein.

List of reference numerals

| | |
|---|---|
| 1 | Exhaust gas purification |
| 2 | system |
| 3 | Particle filter |
| 4 | Oxidation catalyst |
| 5, 5.1, 5.2, 5.3, 5.4 | SCR catalyst |
| 6 | Feed device |
| 7 | Metering unit |
| 8, 8.1, 8.2 | Insulation |
| 9, 9.1, 9.2, 9.3 | Mixer housing |
| | Metering pipe |
| 10, 10.1, 10.2, 10.3 | Closure plate |
| 11 | Metering unit connection |
| 12, 12.1 | Socket |
| 13 | First mixer housing part |
| 13.1 | Second mixer housing part |
| 14 | Connecting section |
| 15, 15.1 | Inlet opening |
| 16 | Clamp |
| 17, 17.1, 17.2 | Inflow opening |
| 18, 18.1, 18.6 | Hood |
| 19 | Rear wall |
| 20 | Metering pipe receptacle |
| 21 | Metering pipe receptacle |
| 22 | Top |
| 23 | Inner wall |
| 24 | Gap |
| 25 | Front edge |
| 26 | Apex |
| 27 | Flush opening |
| 28 | Wall |
| 29 | Wall |
| 30 | Spray cone |
| 31, 31.1 | Flush opening arrangement |
| 32 | Hood |
| 33 | Flush opening |
| 34 | Flush opening |
| 35 | Guide plate |
| 36 | Flush opening |

The invention claimed is:

1. A device for supplying a chemical reactant into an exhaust system of an internal combustion engine, comprising:
   a mixer housing with an inlet opening through which an exhaust gas flow enters into the mixer housing,
   a metering pipe with a first end and a second end, towards which the exhaust gas flow flowing into the mixer housing flows in a transverse direction, wherein a longitudinal extension of the metering pipe extends between the first end and the second end,
   a metering unit which is arranged at the first end of the metering pipe and connectable to a reactant supply for discharging reactant into the metering pipe, and
   means for generating a swirl flow of the exhaust gas flow, wherein said means are designed to generate the swirl flow within the metering pipe, wherein the metering pipe has at least one in-flow opening extending over at least one section of a length of the metering pipe located within the mixer housing, with at least one shovel-shaped hood arranged on the metering pipe directing the exhaust gas flow eccentrically into a respective in-flow opening, wherein the at least one hood encloses the in-flow opening at a side and back thereof and at least mostly covers the in-flow opening in a radial direction of the metering pipe, and wherein a gap remains between the at least one hood and an inner casing surface of the mixer housing, wherein the metering pipe engages through the mixer housing, and the at least one in-flow opening of the metering pipe extends over a casing surface segment of no less than 45° in the circumferential direction, and in an angular configuration has a trapezoidal outline geometry, wherein a shorter side of the trapezoidal outline geometry is, in relation to the inflow direction of the exhaust gas, a rear edge of the in-flow opening following the longitudinal extension, wherein the metering unit is configured to inject the reactant under pressure into the metering pipe such that a spray cone of the reactant being injected into the metering pipe, in the longitudinal extension of the metering pipe in the direction of the second end of the metering pipe, only emerges behind the at least one in-flow opening onto an inner wall section of the metering pipe, and the exhaust gas flowing into the device flows on the outside of this inner wall section of the metering pipe.

2. The device of claim 1, wherein a mouth of a first hood opens in the direction of the inlet opening of the mixer housing, into which mouth the exhaust gas entering through the inlet opening flows directly.

3. The device of claim 2, wherein the in-flow opening assigned to the first hood has its front edge, following the longitudinal extension of the metering pipe, in a region of a crest of the metering pipe located transverse to the inflow direction of the exhaust gas, in the flow direction of the exhaust gas before the crest.

4. The device of claim 2, wherein the in-flow opening assigned to the first hood extends over approximately 90° or more in the circumferential direction of the metering pipe.

5. The device of claim 1, wherein the mixer housing has a hemispherical-shaped interior, and the opening of the hemispherical-shaped interior forms the inlet opening.

6. The device of claim 1, wherein the mixer housing comprises two parts, and a middle longitudinal plane of the metering pipe running transversely to the inlet opening is located in a region of a partition plane of the two parts of the mixer housing.

7. The device of claim 1, wherein the metering pipe comprises two or more in-flow openings, wherein a first in-flow opening is aligned diametrically opposite to a second in-flow opening in relation to the longitudinal axis of the metering pipe, and mouths of the hoods assigned to the first and second in-flow openings are aligned in the same direction with respect to the circumferential direction of the metering pipe.

8. The device of claim 7, wherein the second in-flow opening extends over a smaller casing surface segment in the circumferential direction of the metering pipe than the first in-flow opening.

9. The device of claim 1, wherein the at least one in-flow opening and the hood assigned thereto are arranged in each case, in relation to the longitudinal extension of the metering pipe, off-center in a section of the metering pipe located within the mixer housing, wherein a first distance interval between the at least one hood and a first wall delimiting a swirl chamber of the metering pipe in the direction of the second end of the metering pipe is greater than a second distance interval between the at least one hood and a second wall opposite the first wall.

10. The device of claim 9, wherein the first distance interval is approximately three to five times greater than the second distance interval.

11. The device of claim 1, wherein the metering pipe comprises in a region of the metering unit one or more flush openings which allow exhaust gas to flow through at a reactant outlet of the metering unit.

12. The device of claim 11, wherein the metering pipe comprises a flushing opening arrangement with a plurality of flush openings, which are arranged in a ring form adjacent to the hood covering the at least one in-flow opening.

13. The device of claim 1, wherein the reactant is configured to be injected as a precursor in fluid form, into the metering pipe.

14. The device of claim 13, wherein the precursor is an aqueous urea solution.

15. The device of claim 1, wherein at least two or a multiple of two injection openings are provided in each case with a shovel-shaped injection opening hood, which injection opening hoods are arranged, in relation to the swirl effect generated thereby, in the direction of the first and/or second end of the metering pipe.

16. The device of claim 15, wherein the injection opening hoods are arranged alternating towards the first and second end of the metering pipe.

17. The device of claim 1, wherein the inlet opening of the mixer housing is connected directly to an outlet of an exhaust gas purification apparatus of the exhaust system.

18. The device of claim 17, wherein the exhaust gas purification apparatus is a particle filter.

19. An exhaust gas purification system for reducing the NOx content of exhaust gas of an internal combustion engine, comprising a selective catalytic reduction (SCR) catalytic converter and a device according to claim 1, wherein the device is arranged upstream to the SCR catalytic converter in the flow direction of the exhaust gas, for introducing a reduction reactant required for SCR catalysis into the exhaust gas purification system.

20. The exhaust gas purification system of claim 19, wherein the reduction reactant is an aqueous urea solution.

* * * * *